Aug. 3, 1965   P. N. BAKER   3,197,863
FORGING

Filed Oct. 30, 1961   4 Sheets-Sheet 3

INVENTOR
PETER NORRIS BAKER (deceased)
BY RAYMOND BAKER, Administrator

Holcombe, Wetherill + Brisebois
ATTORNEYS

FIG. 5.

3,197,863
FORGING
Peter Norris Baker, deceased, late of Sheffield, England, by Raymond Baker, administrator, Sheffield, England, assignor to The British Iron and Steel Research Association, London, England, a British association
Filed Oct. 30, 1961, Ser. No. 151,133
Claims priority, application Great Britain, Nov. 3, 1960, 37,810/60; Nov. 16, 1960, 39,317/60; Nov. 17, 1960, 39,493/60
23 Claims. (Cl. 72—11)

This invention relates to forging and is particularly concerned with the combination of a forging press and a manipulator, by which a workpiece may be forged to a required shape in a succession of passes; in each of the passes one or more squeezes being given to the workpiece by the press, the workpiece being moved by the manipulator between successive squeezes in order to present different portions of the surface to the press after each squeeze, and the workpiece being positioned between successive passes.

It is usual for such forging operations to make use of manual control of both the press and the manipulator for each squeeze, and an object of the present invention is to reduce the amount of such manual control exerted during forging operations.

According to a first aspect of the present invention a forging press having a manipulator for positioning a workpiece relative thereto is provided with, a press control circuit for controlling the separation of the press tools, a manipulator control circuit for controlling the position of the manipulator, a pass control circuit for controlling the latter press and manipulator control circuits to cause the press and manipulator to move in a predetermined manner during a succession of passes, and an interpass control circuit for re-positioning the manipulator between the successive passes.

In a second aspect according to the present invention, forging apparatus comprises a reciprocable forging press, a manipulator for supporting the workpiece to be forged by the press, which manipulator is remotely controllable in respect of the height of the workpiece relative to the press, and an automatic control circuit controlled by the press for adjusting the height of the workpiece in response to the dimensions of the workpiece and/or the separation of the tools of the press.

In accordance with a third aspect of the present invention, a control system for a manipulator for a press forging a workpiece in a sequence of squeezes along its length comprises means for continuously monitoring the position of the press tools with respect to both ends of the workpiece, and means controlling the movement of the manipulator relative to the press, between successive squeezes, in the longitudinal direction of the workpiece and controlled by the monitoring means and the required positions of the press relative to the end of the workpiece at the start and end of the sequence.

A fourth aspect of the present invention provides control apparatus for automatic forging which apparatus comprises means for controlling reciprocation of the tools of a forging press and movement of the workpiece between successive squeezes of the tools, and a control system so arranged that forging of the workpiece is automatically effected in a number of phases, in each of which phases the workpiece is forged to different prescribed shape during a sequence of passes constituting such phase, and each phase is initiated automatically on the completion of the preceding phase.

Various proposals have already been made in U.S. Patents Nos. 2,922,053, 3,036,253, 3,118,326, 3,139,569 for the control of individual forging functions which are taken into account by the different aspects of the present invention, and more particular reference will be made to these specifications in the following description, by way of example, of the different aspects and forms of this invention with reference to the accompanying drawings, in which:

The above-mentioned U.S. Patents Nos. 2,922,053, 3,036,253 and 3,139,569 describe control circuits for controlling the movement and positions of a forging press and its associated manipulator. In the first of these specifications, the separation of the press tools is controlled so that the press reciprocates between adjustable predetermined limits, and in the second of these specifications, the manipulator is controlled externally to bring the workpiece to any desired longitudinal, vertical and rotational position.

Thus in one form of the invention in its first aspect above, the press and manipulator control circuits may be of the form described in the latter specifications. The pass control circuit may comprise control consols on which are set the upper and lower limit of reciprocation, and the longitudinal, vertical and rotational positions to which the manipulator, or rather the peel carrying the workpiece is to be brought.

For controlling the press and manipulator during a succession of passes in accordance with data supplied before the beginning of the forging operation, a number of panels may be supplied, one for each of the maximum number of passes likely to be employed in any one forging operation, and each such panel including a number of multi-position switches or the like, on which the data relating to the press and manipulator movements in a single pass can be set up. For example, each panel may have provision for setting up the upper and lower position of the upper press tool, the horizontal, vertical and rotational positions of the manipulator at the start of the pass, and the horizontal and/or rotational movement to be effected by the manipulator between successive squeezes in the pass.

During automatic control, the press and manipulator are controlled in accordance with the data set up on the panels, the panels being rendered effective for control successively by a stepping device, or multi-position switch, which, at the end of each pass, steps on one position so as to connect the panels successively to the press and manipulator control circuits.

At the end of each pass, the workpiece must be repositioned with respect to the press tools. For example, if each pass consists of a succession of squeezes applied successively along two faces of a workpiece, the workpiece may be withdrawn to its starting position at the end of each pass, except perhaps after the last pass.

Figure 1:
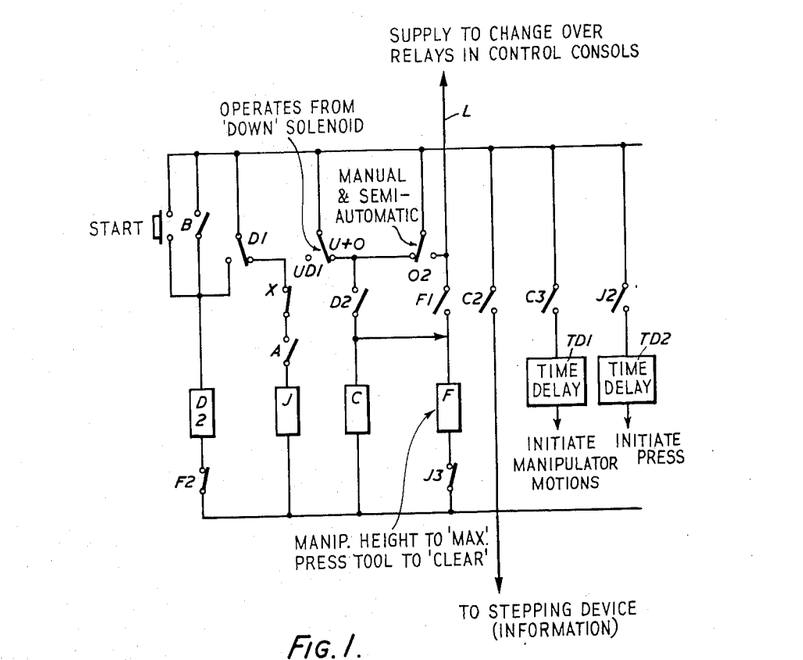
FIGURE 1 illustrates one form of an interpass control circuit.

FIGURE 1 illustrates one embodiment of an interpass circuit for effecting the necessary manipulator movement between passes and for initiating the next pass.

In the operation of FIGURE 1, the automatic control of the press and manipulator for the succession of passes is initiated by closure of the "START" button which completes a circuit for relay D through the normally closed contacts F2. Relay D, following energisation thereof, is maintained energised by the resultant changeover of its contacts D1 from the normal position shown in FIGURE 1.

The closing of contacts D2 from their normal open position as shown, completes an energising circuit for relay C through contacts O2, and for relay F through contacts O2 and normally closed contacts J3. When relay C is first energised, a circuit is completed causing the stepping device to be stepped on one position from zero, which stepping on causes contacts O2 to be changed over from their position shown for manual and semi-automatic control, to their other position for automatic control. This changing over of contacts O2 completes a circuit on line L to relays which transfer control of the press and manipulator from the manual controls which are made available on the control consoles, to the panels for automatic operation. This transfer of control by a circuit on line L is made possible by the energisation of relay F and the consequent closure of its contacts F1. Also, relay F is maintained through its make-before-break contacts F1 and the changed over contacts O2.

Further contacts of relay F operate the control circuit of the press and the manipulator to raise the upper press tool to its "CLEAR" position in which movement of the workpiece is unobstructed, and to move the manipulator to raise the workpiece above the lower press tool.

The closing of contact C3 of relay C from the normal open position shown, operates a time delay device TD1 which, after a predetermined time delay, initiates the manipulator control circuit to bring the manipulator into the position set on the control panel for the first pass.

Relay D is de-energised by the opening, from the position shown, of contact F2 on the energisation of relay F, with the result that contacts D1 are changed over and relay C is de-energised by the opening of contacts D2. When the manipulator movements, initiated by the time delay device TD1 are completed, contacts A in series with a relay J are automatically closed. Relay J is then energised through the contacts D1, contacts X (closed) and contacts A. Relay J de-energises relay F by its contacts J3 and, by closure of its contacts J2, operates a second time delay device TD2, which, after a prescribed time delay sufficient to allow the workpiece to be lowered to the correct forging height before press movement is initiated, operates the control circuit for the press to initiate its movements and those for the manipulator for the duration of the pass according to the data preset on the control panel for the first pass. Relay J remains energised until the end of the pass.

At the end of the first pass, during which the manipulator and press has been controlled according to the data set on the "pass 1" control panel, the contacts B are automatically closed in response to and end of pass signal, re-energising relay D, de-energising relay J by the changeover of contacts D1 and initiating a second cycle of the circuit. As in the first cycle, relay C is then energised but not, this time, through the contacts O2 which are now connected to line L. Instead, relay C is energised through contacts UD1 when these contacts are in their position indicated as U+O and indicating up and off in relation to the upper press tool motion. However contacts UD1 could equally well be operated by a relay connected in series with the solenoid controlling the downward movement of the upper press tool, such that, only when this "down" solenoid is de-energised, that is, when the upper press tool is being driven upwardly or is not subject to movement, are the contacts UD1 in the position shown. Therefore, if contacts B are closed during the energisation of the "DOWN" solenoid, relay C is not energised until that solenoid is de-energised. Thereafter, the circuit operates in the same manner as has been described for the first pass and the sequence of operation of the relays is followed in each of the remaining passes, the press and manipulator being controlled for each pass by the corresponding control panel. The data set up on the control panel for the final pass includes nothing relevant to the press movement and is designed merely to withdraw the manipulator. Accordingly, when the stepping device is operated by contacts C2 to the position for the final pass, contacts X are automatically opened and prevent the energisation of relay J. As a consequence, the manipulator is controlled, by virtue of relay C, to withdraw the manipulator in accordance with the data set in the control panel for the last pass, but prevents the press being moved from the "CLEAR" position to which it is brought by the closing of the contacts of relay F. The movement of the manipulator in this final pass is arranged to bring the workpiece well out of the press tools in readiness for removal from the manipulator.

The successive movements of the press and manipulator are therefore as follows:

(1) The upper press tool moves to the "CLEAR" position, by closing one of the contacts of relay F.

(2) The manipulator raises the workpiece to its maximum height, on operation of other contacts of relay F.

(3) Control is transferred to the automatic control panels by the changeover of contacts O2 and the stepping switch is moved into its first position to render effective the "pass 1" control panel.

(4) The manipulator moves the workpiece to the correct longitudinal and rotational positions and the workpiece is then lowered to the correct forging height, as determined by information on the "pass 1" control panel. When these movements are completed a signal closes contacts A.

(5) The upper press tool descends and forges the workpiece between said upper and lower limits according to information on the "pass 1" control panel, movement of the press being initiated by contact J2.

(6) Each time the press tool reverses and releases the workpiece, signals are routed to the appropriate control circuits of the manipulator to move the workpiece in readiness for the next squeeze.

(7) A device detecting the last squeeze of each pass operates contacts B to repeat the series of motions above, each pass being controlled according to the information on the relevant control panel.

(8) At the end of a forging programme, contacts X are opened to permit manipulation to take place but to prevent further forging.

While, in the above description, reference has been made to separate preset control panels for each pass, it is to be understood that in other forms of the invention a complete phase of forging operations may be predetermined by the information preset on a single control panel. For example a single control panel for one phase may be set to predetermine the final dimensions of the workpiece at the end of such phase, and the press and manipulator control circuits be so arranged to determine the press tool and manipulator movements in each pass of that phase in response to current dimensions of the workpiece which are automatically measured during the pass in question, together with final dimensions of the workpiece determined by the preceding pass or passes, until the required final dimensions are obtained. For example, when the workpiece is to be forged to a square section along its whole length, it may be sufficient merely to have a single panel on which some starting dimensions and the desired final square dimensions of the workpiece are set up.

One example of the latter arrangement for automatic forging during a squaring phase is described in U.S. Patent application Serial No. 148,504, filed October 30, 1961, now Patent No. 3,175,382, by J. G. Wistreich.

The second aspect of the present invention is concerned with controlling the height of a workpiece relative to the press tools during forging, and the control features of the above-mentioned U.S. Patents Nos. 2,922,253, 3,036,253 and 3,139,569 may be employed for this purpose.

In one form of this aspect of the invention the height of the workpiece is controlled continuously by the separation of the forge tools, so that the centre line of the workpiece is midway between the tools at all times. In this way, as the tools are separated at the conclusion of a squeeze, the manipulator is automatically operated to raise the workpiece and to enable the unforged portion of the workpiece to be introduced between the open tools.

In one embodiment of such form of height control, the remote position control system for the height of the workpiece described in said U.S. Patent No. 3,139,569 is automatically controlled by the separation of the press tools of the forging press in response to the output signal from the upper press tool position transducer of U.S. Patents Nos. 2,922,053 and 3,036,253 which signal gives an indication of the current position of that press tool, and therefore of the separation between the two press tools. This signal is employed to control the height remote position control system of the manipulator so that the centre line of the workpiece is varied continuously to be at a height above the lower press tool equal to half the separation of the two press tools. During each squeeze of the forging press, the centre line of the workpiece is then exactly half way between the tools and, as a result, the workpiece is properly presented throughout the squeeze. When the upper tool reverses and proceeds to its upper limit, between successive squeezes, the manipulator does not move longitudinally between squeezes until the upper tool is rising, the manipulator always lifts the workpiece clear of the bottom tool before longitudinal movement commences.

Between passes of the forging operation, when the workpiece is to be manipulated rotationally to present difference faces to the press tools, the upper press tool is moved to a "rest" position giving sufficient separation between the workpieces to enable the workpiece to be rotated without fouling the tools. During this upward movement of the upper tool, the manipulator is also controlled to lift the workpiece to keep the centre line between the tools, so that the diagonal of the workpiece clears the lower tool on rotation.

In a second form of the height control aspect of the invention, the nominal height of the workpiece is controlled by the unforged thickness of the workpiece, but is spring mounted enabling it to be forced downwardly during the penetration of the tools during a squeeze. On release of the work tools, the workpiece automatically rises under spring action to clear the tools for longitudinal movement between squeezes.

In this second arrangement, the workpiece is carried by the manipulator on a spring mechanism, permitting the workpiece to yield relative to the manipulator when pressure is applied downwardly to it. In this case, the height remote position control system of the manipulator is arranged to be controlled automatically, so that the workpiece centre line, when pressure is not exerted by the press, is at a distance above the lower press tool equal to half the thickness of the workpiece, before forging. For this purpose, the manipulator height remote position control system may be automatically controlled by the signal on line 23 of the arrangement of FIGURE 2 described above. When penetration of the workpiece by the tools takes place, the sprung lifting mechanism of the manipulator gives so as to maintain the centre line of the workpiece centrally between the press tools. On the other hand, as soon as the upper tool reverses and rises, the sprung lifting mechanism lifts the workpiece rapidly clear of the lower tool to permit intersqueeze longitudinal movement of the workpiece. At the conclusion of a longitudinal pass, as indicated by the signal from element 38 of FIGURE 2, the manipulator height remote control system is controlled by the separation of the work tools, that is direct from the position transducer driven by the press crosshead, with the result that the workpiece centre line is kept centrally between the tools and interpass rotational manipulation of the workpiece is permitted without fouling the lower press tool.

Where the workpiece is pivotally supported and is tilted by the press tools downwardly to a horizontal position during a squeeze, the pivot point may, in a third form of this height control aspect, be automatically controlled, vertically by the forged thickness of the workpiece, so that it is maintained at a height above the lower press tool equal to half the forged thickness of the workpiece. This third form of height control is suitable for use with manipulators, such as that described in British patent specification No. 874,909 in which the peel is tiltable about an axis which can be adjusted in height by the manipulator height remote position control and is spring biased so that the workpiece is normally tilted with its free end raised: on the descent of the upper tool, the workpiece is then forced to the horizontal position before the squeeze commences; and when the upper tool reverses, the workpiece automatically rises to the tilted position for inter-squeeze manipulation. In this third form of height control, the fulcrum or tilt axis of the peel is automatically kept at a height above the lower press tool equal to half the thickness of the workpiece after forging. This is effected by taking the signal from the multiplier 24 of the arrangement of FIGURE 2 which signal represents the final or forged thickness of the workpiece. This signal is applied to the manipulator height remote position control to set it automatically during the first squeeze of a longitudinal pass. When the height of the fulcrum is controlled in this way, the workpiece is always horizontal when squeezing is complete and proper presentation is again attained.

Considering now the third aspect of this invention, at present, when the forging is to be completed in any pass at a fixed distance from the end of the workpiece approaching the press tools, the end position must be calculated very carefully and marked before forging, since the workpiece elongates during the pass.

An object of the present invention in its third aspect is to enable the manipulator to be controlled automatically so that forging is completed at the required point, and the operation of the invention in this aspect will be described with reference to FIGURES 3, 4 and 5.

Figure 3:
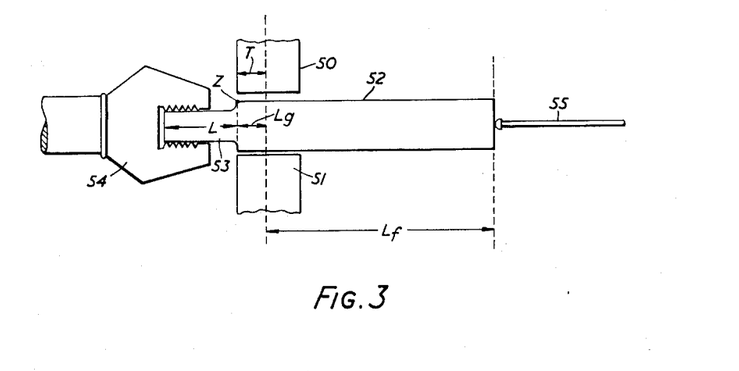
FIGURES 3, 4 and 5 illustrate an arrangement for forging between predetermined longitudinal limits along a workpiece.

Referring to FIGURE 3, the press tools, having a width 2T, are indicated schematically at 50, 51. A workpiece 52 having a tag 53 is held by, and supported by, a manipulator peel 54. The manipulator carrying peel 54 is controlled as to longitudinal position, that is, in the direction of the length of the workpiece 52, by a remote position control system as described in U.S. Patent No. 3,139,569 No. 852,272, so that the position of the manipulator, and hence of the workpiece 52, is known at all times. When the length L of the tag 53 is known, the distance Lg between the starting point Z of the workpiece surface proper and the centre line of the press tools 50, 51 is continuously monitored by the remote position control system for the manipulator. A plunger 55 which engages the free end of the workpiece 52 and which is described in P. N. Baker's U.S. patent application Serial No. 35,838, filed June 13, 1960 (now abandoned) continuously monitors the distance Lf between the free end of the workpiece X and the centre line of the press tools 50, 51.

It is important to monitor continuously the distance Lf, as well as the distance Lg, because, during a forging pass in which the surface of the workpiece 52 is engaged successively by the press tools in a succession of overlapping squeezes, say, the workpiece elongates and any measurement taken from the gripped end of the workpiece is incapable of indicating the position of the press tools 50, 51 relative to the free end X. Therefore, if it is required to complete the pass with the tools 50, 51 at a specified distance from the free end X, the position of the tools 50, 51 relative to that free end must be measured.

Figure 4:
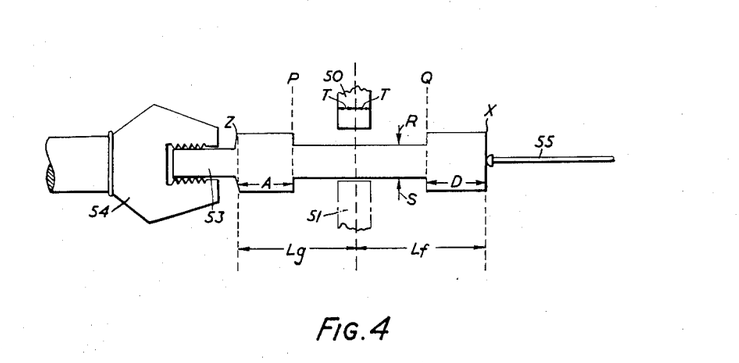
Figure 5:
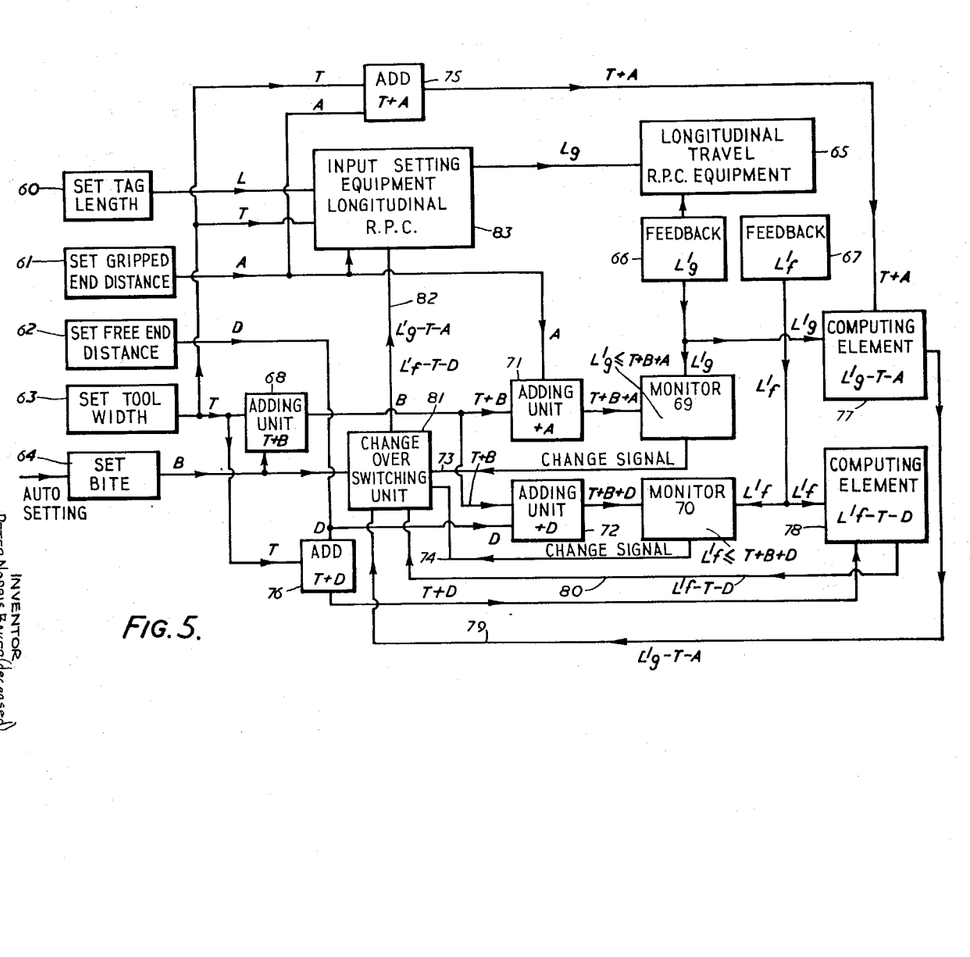

FIGURE 5 indicates the control circuit for forging the workpiece 52 of FIGURE 4 in a pass comprising a succession of squeezes, between which the manipulator moves the workpiece through a bite distance less than 2T. The control system has four manually operated devices 60, 61, 62, 63 on which can be set respectively the length L of the tag 53, the distance A between the gripped end Z and the point at which forging is to start, the distance D between the free end X of the workpiece and the point at which forging is to end, and the selected tool width T. In addition, the bite, or normal movement of the manipulator between successive squeezes of the press, B, is set into the apparatus either manually or automatically by a computing element 64 such as that described in Wistreich application Serial No. 148,504, filed October 30, 1961 where the bite is derived from multipliers 31 and 33.

The longitudinal travel of the manipulator is controlled by a remote position control system 65 as described in L. N. Bramley's U.S. patent application Serial No. 852,272, filed November 12, 1959, and illustrated in FIG. 4 thereof and a monitor feedback device 66 continuously measures the current value of $L'g$ the distance between the point Z and the centre line of the press tools. A second monitoring feedback device 67, which is the potentiometer 23 described in P. N. Baker's U.S. patent application Serial No. 35,838 (now abandoned), similarly measures continuously the value $L'f$.

Signals representing T and the bite B are applied to an adding unit 68 and the sum is applied to two monitoring comparing circuits 69, 70 via adding units 71, 72, which receive the outputs from devices 61, 62 respectively. The output signal from feedback device 66 is applied to comparing circuit 69, which emits a signal on line 73 when the output from adding unit 68 is equal to or exceeds the output from feedback device 66. Similarly, the output from monitor 67 is applied to comparing circuit 70, so that a signal is emitted on line 74 when the output from adding unit 68 is equal or is greater than the output from feedback device 67. The tool width signal from device 63 is applied in parallel to two further adding units 75, 76 which also receive the outputs from devices 61, 62 respectively, and the outputs from which also are applied to two subtracting circuits 77, 78. The subtracting circuits 77, 78, also receive the outputs from feedback devices 66, 67. The outputs from subtracting circuits 77, 78 on lines 79, 80 are ($L'g-T-A$) and ($L'f-T-D$) respectively. The signals from the bite element 64 and on the lines 79, 80 are applied to a change over switch 81, which is controlled by the signals on lines 73, 74. The arrangement is such that an output line 82 of switch 81 receives the bite signal, when there is no signal on either of lines 73, 74; receives the signal on line 79 when there is a signal on line 73; and receives the signal on line 80 when there is a signal on line 74.

The signals from the setting devices 60–63 and the signal on line 82 are applied to a control circuit 83 which, in accordance with those signals, controls the remote position control circuit 65 to determine the movement of the manipulator at the start of the pass and between the successive squeezes of the pass. The signals from the feedback device 66, are also applied to the circuit 65 as a feedback signal in order to ensure that the manipulator moves to the positions determined by circuit 83.

In the case of the forging operation illustrated in FIGURE 3, devices 60, 63 are set according to the existing tag length L and half tool width, T, as measured on the workpiece and tools 50, 51 respectively. Devices 61, 62 are both set to zero, since forging is to start and stop at the ends Z, X of the workpiece.

Assuming the first pass is on the retreat, that is, the manipulator moves away from the press tools 50, 51 during the pass, monitor 69 is rendered ineffective and circuit 83 operates the remote position control circuit 65 to bring the workpiece to the starting position shown in FIGURE 3 with $Lg$ equal to T. The forging sequence is then commenced, the manipulator being moved between successive squeezes by a distance set by the bite computing element 64, there being signals on neither of lines 73, 74. Forging is continued with the bite determined by element 64, until the free end X of the workpiece approaches tools 50, 51 so closely that the current value of $L'f$ is less or equal to (T+B+D), the distance D being zero. When that occurs, a signal is emitted on line 74 so that circuit 83 is supplied on line 82 with the signal from line 80. Therefore, the manipulator movement for the last bite is automatically reduced from B to $Lf-T-D$ the amount necessary to bring the free end X under the edge of the tools 50, 51 and to ensure that in the last squeeze the tools 50, 51 do not overlap the free end of the workpiece.

The movement of the manipulator may then be reversed for the next pass, the workpiece being turned through 90° or other angle between the passes. Therefore, the next pass is effected on the advance, with the manipulator approaching the press tools 50, 51. In this pass, monitor 70 is rendered ineffective and monitor 69 is effective and the operation is as above described, with the exception that, for the last bite of the pass, monitor 69 controls switch 81 and the movement of the manipulator before the last bite is determined by the subtracting circuit 77. It will be seen therefore that once the original dimensions have been set into the devices 60–63 the manipulator is controlled automatically to cause forging of the workpiece between the two set points Z, X, and no prior calculation of volumes or the like is required.

The automatic control of the manipulator becomes even more important where the forging is of more complex form, as in FIGURE 4 which shows the formation of a central recess in the manufacture of a pair of rolls. Here, the forging must be effected between predetermind points P, Q intermediate the effective ends of the workpiece 52. The distances A, D between the points P, Q and the ends Z, X of the workpiece are predetermined and the length P, Q is either of no importance or can be preselected by calculating the thickness RS required to achieve that distance P, Q. In this case, device 61 (FIGURE 5) is set to the value A and device 62 is set to the value D. The circuit of FIGURE 5 operates as before and, when forging is being effected on the retreat the bite for the last squeeze is reduced in order to bring the faces of the tools 50, 51 at the point Q at the distance D from the free end of the workpiece. Similarly, when forging on the advance, the last bite is reduced to bring the edges of the tools 50, 51 to the point P.

While the operation of the system of FIGURE 5 has been described in relation to the forging of two relatively simple forms, it will be readily understood that the circuit may be modified for more complicated forms.

The above description has dealt more particularly with automatically controlled forging in relation to comparatively simple forms, and it was suggested that the information for every pass of a forging operation be predetermined and set up for the successive control of the press and manipulator during each pass.

In the case of forging more complicated forms it is desirable to divide the forging operation into a number of different phases in each of which a different shape is given to the workpiece in a succession of passes constituting a phase. Thus, to take a relatively simple example, in order to produce a forging of circular cross-section, the workpiece may first be forged to square cross-section of a given size, then forged to octagonal cross-section of given dimensions, and lastly forged to circular cross-section. Each of these phases of the overall forging operation requires a different type of control in that, for example, the angle through which the workpiece is turned between successive forging passes differs for square and octagonal.

It has been found in fact that forging operations may be generally divided into different phases each of which is characterised by a comparatively simple pattern of events, and that such phases can be readily programmed to follow one after another to automatically control the forging of a complex form. One example of such a phase is described by J. G. Wistreich in his application Serial No. 148,504, filed October 30, 1961, in the case of squaring and other phases may comprise cogging to octagonal form, 16-sided form, or 32-sided form; swage cogging or rounding, following the latter phases; or knifing, or cutting; for example.

Figure 2:
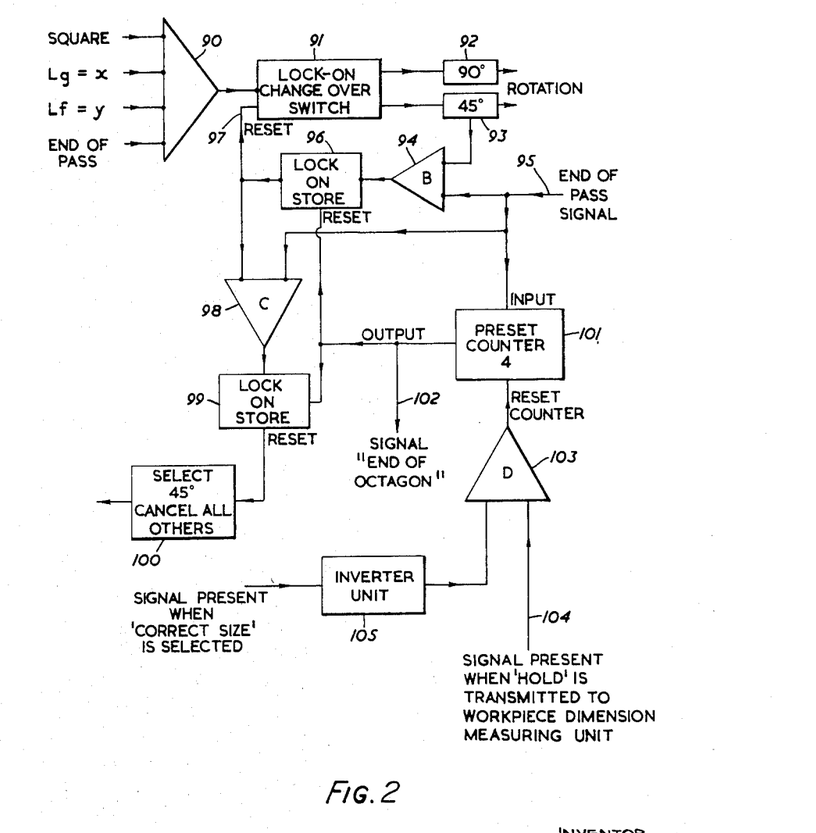
FIGURE 2 illustrates an arrangement for controlling a sequence of forging phases each of which comprises a succession of predetermined passes.

FIGURE 2 of the drawings illustrates one control arrangement to take account of square and octagonal phases, between predetermined limits according to the preceding, third aspect of the invention.

In FIGURE 2, a coincidence gate 90, which is operated when the forging to square cross-section has been completed, controls a bistable switch 91, which normally energises a control circuit 92 to cause the manipulator peel to rotate through 90°. In its other stable state, it controls a control circuit 93 for rotating the peel through 45°. Control circuit 93, when operated, passes a signal to a coincidence gate 94, which also receives a signal on line 95 at the end of each forging pass. When gate 94 simultaneously receives signals on its two inputs, it emits a signal to a bistable store 96, causing that store to be set and to apply a signal on line 97 to the input of switch 91. Store 96, when set, also applies a signal to a third coincidence gate 98, the other input of which is connected to the end of pass line 95. The output of gate 98 is applied to a further bistable store 99 which, when set, applies a signal to control circuit 100 causing the manipulator peel to be rotated through 45°, regardless of control circuits 92, 93.

End of pass signals on line 95 are also applied to a counter 101 having a capacity of four. The output from counter 101, which appears when the counter has counted four pulses is applied to reset the bistable stores 96, 99 and to emit a signal on line 102 indicating that a forging of octagonal form and with the required dimensions has been produced. Counter 101 is reset by pulses from a coincidence gate 103, which has two inputs. One input receives on line 104 "hold" signals from the workpiece surface detector 21 of FIGURE 2 when the workpiece is connected to an inverter unit 105, which is operated by the monitor 35 of FIGURE 2 when the workpiece is forged down to the required dimension, as set into that monitor 35.

The coincidence gate 90 is shown as having four inputs and, for a signal to be transmitted to switch 91, there must be signals on all four inputs at the same time. The first input is obtained when the workpiece, in the preceding phase, has been forged to square cross-section of the required size. The second and third inputs are supplied when the workpiece has been forged between points at predetermined distances from the ends of the workpiece. The fourth input is supplied at the end of each pass. Therefore, the phase for converting the square cross-section to octagonal cross-section is initiated only when the forging to square cross-section is completed. When this has been effected, the octagonal-forming phase is automatically initiated by the application of a signal to switch 91, causing control circuit 93 to be energised and thereby the workpiece to be rotated through 45°, bringing two opposite corners of the workpiece beneath the work tools. The press and manipulator then execute a pass, during which the workpiece is forged in a sucession of squeezes to a constant thickness, as described in U.S. Patent No. 3,118,326 and FIGURE 2. At the conclusion of the pass, gate 94 receives signals on both its inputs and sets the store 96, thereby resetting the switch 91 and causing the circuit 92 to produce a 90° rotation of the workpiece. This rotation brings the other pair of opposite corners of the workpiece beneath the tools and a second pass is effected, as before. At the end of this second pass, the end of pass signal on line 95 is applied to gate 98 which, since it is already supplied with a signal from store 96, sets the store 99. Control circuit 100 is then energised to cause the workpiece to be turned through 45° after each pass.

Forging of the workpiece continues until the thickness at the end of each of four consecutive passes is the required value. Each time a pass is concluded with the thickness not at the required value, the absence of an input signal to inverter unit 105 causes a signal to be transmitted through gate 103 to reset counter 101. Conversely, when the thickness at the end of any pass is the required size, no signal is emitted by the inverter unit 105 and counter 101 is not reset. If, therefore, no signal is applied to inverter unit 105 on four successive passes, counter 101 counts four end of pass signals on line 95 and emits a signal on line 102 concluding the forging phase and initiating the next phase. At the same time, the counter output resets stores 96, 99, in readiness for the next time a workpiece is to be forged from square to octagonal cross-section.

It will be understood that the "end of octagon" signal on line 102 can be used to initiate forging on another section of the workpiece, rather than on the same section. Also, the circuit may be readily modified to control forging from octagon to sixteen sides by changing the angles of rotation set by circuits 92, 93, 100 and increasing the capacity of counter 101.

The data for each of the forging phases, whether on the same part of the workpiece or on different parts, may be stored before the start of the first phase, using setting dials, patch board connections, tape, punched cards or digit stores. The data to be stored for each phase may comprise the particular phase required, the starting and finishing points for longitudinal travel for the workpiece in each phase, the finishing thickness of the workpiece, and the tools to be employed during the phase.

What is claimed is:

1. Control apparatus for automatic forging comprising means for controlling reciprocation of the tools of a forging press and movement of the workpiece between successive squeezes of the tools, and a control system so arranged that forging of the workpiece is automatically effected in a number of phases, in each of which phases the workpiece is forged to a different prescribed shape during a number of passes constituting such phase, and each phase is initiated automatically on completion of the preceding phase, said control system comprising programme means for controlling said control means in predetermined manner for different phases, and means for prescribing the required dimensions of the workpiece at the termination of such phases, said programme means comprising means for controlling said control means to maintain the reduction of a workpiece to a prescribed proportion of its initial thickness during each pass of a phase, to maintain the longitudinal movement of the workpiece to prescribed proportion of its initial width between successive squeezes of each pass of such phase, and to turn the workpiece through a right angle between successive passes of such phase, to provide such phase as an automatic squaring phase.

2. Apparatus according to claim 1 wherein said programme means squaring phase control means is further adapted to control an octagonal forming phase following a squaring phase by the provision of means to turn the workpiece through half a right angle before the first phase of the octagonal forming phase.

3. In a forging press operation on an elongate workpiece supported by a manipulator, which operation includes successively squeezing the workpiece along its length by moving the workpiece longitudinally intermediate press squeezing operations, the method of controlling the manipulator movement which method comprises monitoring the position of the press tools relative to both ends of the workpiece, and controlling the manipulator movement for longitudinal workpiece movement relative to the press tools in response to the current monitored press tools position and the required press tools position relative to the ends of the workpiece.

4. In a forging press operation on an elongate workpiece supported by a manipulator, which operation includes a forging pass wherein the workpiece is squeezed successively along its length by moving the workpiece longitudinally intermediate press squeezing operations, the method of controlling the manipulator movement which method comprises repeatedly monitoring the position of the press tools relative to both ends of the workpiece during a pass, controlling the manipulator movement for longitudinal workpiece movement relative to the press tools for initiation of the pass in response to the current monitored press tools position and the required press tools position relative to the one end of the workpiece which is to move away from the press tools during said pass, and thereafter controlling said manipulator movement in response to the current monitored press tool position and the required press tools position relative to the other end of the workpiece which is to move towards the press tools during said pass.

5. A method according to claim 4 which comprises monitoring said press tools position by reference to the centre line of the tools, storing representations of the starting point of the workpiece length to be forged and the half width of the tools to be used in a pass, and controlling the movement of the manipulator for longitudinal workpiece positioning for initiation of said pass in response to comparison of the sum of the starting point and half tools with representations with the monitored tools position relative to said workpiece one end.

6. A method according to claim 5 which comprises storing representations of the end point of the workpiece length to be forged and a prescribed manipulator movement for longitudinal workpiece movement relative to the press between successive press squeezes, comparing, prior to each squeeze after the first squeeze, the monitored press tools position relative to the said workpiece other end with the sum of the representations of said end position, half tool width and prescribed movement, controlling the succeeding manipulator movement relative to the press by said prescribed movement representation in the event that the compared monitored position is greater than said sum, and controlling said succeeding manipulator movement in response to said end point representation in the event that said compared monitored position is not greater than said sum.

7. A method according to claim 6 which comprises forging between said start and end points in successive passes, successive ones of which are in opposite directions, and reversing the roles of said start and end points after each pass.

8. Control apparatus for a workpiece manipulator for effecting longitudinal workpiece movement relative to the tools of a forging press intermediate a succession of press squeezes on the workpiece along its length, comprising means for continuously monitoring the positions of both ends of the workpiece relative to the press tools, means for storing representations of the position of the workpiece ends relative to the press tools at the start and end of the succession of squeezes, and means responsive to the monitoring means and the storing means for controlling the manipulator movement between successive press squeezes.

9. Control apparatus for a workpiece manipulator for effecting longitudinal workpiece movement relative to the tools of a forging press intermediate a succession of press squeezes on the workpiece along its length in a forging pass, comprising means for monitoring the position of both ends of the workpiece relative to the centre line of the press tools, storage means for storing representations of the required start point relative to the press tools centre line of the one end of the workpiece to move away from the press tools during a pass and the half width of the press tools to be employed in said pass, means for comparing the sum of the start point and half tools width representations with the monitoring means output relative to said workpiece one end, and means for controlling the manipulator for initiation of said pass in response to the comparing means.

10. Apparatus according to claim 9 comprising further storage means for storing representations of the required end point relative to the press tools centre line of the other end of the workpiece to move towards the press tools during said pass and a prescribed manipulator movement to be made between successive squeezes of said pass, means for comparing, prior to each press squeeze after the first squeeze, the monitoring means output relative to said workpiece other end with the sum of the representations of said end point, half tool width and prescribed movement, means responsive to the comparing means for controlling the succeeding manipulator movement relative to the press by said prescribed movement in the event that the compared monitored position is greater than said sum, and means responsive to said comparing means for controlling said succeeding manipulator movement in response to said end point representation in the event that said compared monitored position is not greater than said sum.

11. Apparatus according to claim 10 comprising switch means for reversing the roles of said storage means for start point and end point representations after each pass when forging is effected in opposite directions during successive passes.

12. Control apparatus for regulating the movement of an automatic step-by-step workpiece manipulator of the type comprising means for regulating the distance which it will move at any one step, said control apparatus comprising adjustable means for supplying to said regulating means a first signal proportional to a desired movement for said manipulator during a normal step, means for supplying a second signal proportionate to the distance between the actual position of said workpiece and a predetermined position therefor, means for comparing said first and second signals and means for substituting said second signal for said first signal in the supply to said regulating means whenever said first signal exceeds said second signal.

13. The method of regulating the movement of an automatic step-by-step workpiece manipulator which comprises the step of generating a first signal proportionate to a desired movement by said manipulator during a normal step, generating a second signal proportionate to the distance between the actual position of said workpiece and a predetermined position therefor, comparing said signals in advance of each step and regulating the length of that step in proportion to the lesser of said signals.

14. Control apparatus for regulating the movement of an automatic step-by-step workpiece manipulator relative to the press tools of a forging press, said manipulator being of the type comprising means for regulating the distance which it will move at any one step, said control apparatus comprising adjustable means for supplying to said regulating means a first signal proportional to a desired movement for said manipulator during a normal step, means for supplying a second signal proportionate to the distance between the actual position of said workpiece and a predetermined position therefor relative to said press tools, means for comparing said first and second signals and means for substituting said second signal for said first signal in the supply to said regulating means whenever said first signal exceeds said second signal.

15. Control apparatus as claimed in claim 14 comprising means for providing a third signal representative of half the width of the press tools, means for providing a fourth signal representative of a predetermined distance from one end of the workpiece toward the other, means for providing a fifth signal proportional to the distance between said one workpiece end and the center of said press tools, and means for subtracting said third and fourth signals from said fifth signal to derive said second signal.

16. Control apparatus as claimed in claim 14 for use with a manipulator adapted to move a workpiece back and forth along a predetermined path between two predetermined positions relative to said press tools, said control apparatus comprising means for causing said second signal to be proportional to the distance between the actual position of said workpiece and the one of said predetermined positions toward which said workpiece is being moved.

17. The method of regulating the movement of an automatic step-by-step workpiece manipulator relative to the press tools of a forging press, which method comprises the steps of generating a first signal proportionate to a desired movement by said manipulator during a normal step, generating a second signal proportionate to the distance between the actual position of said workpiece and a predetermined position thereof relative to said press tools, comparing said signals in advance of each step, and regulating the length of that step in proportion to the lesser of said signals.

18. The method claimed in claim 17 comprising the step of deriving said second signal by providing a third signal representative of half the width of the press tools, a fourth signal representative of a predetermined distance from one end of the workpiece toward the other, a fifth signal proportional to the distance between said one workpiece end and the center of said press tools, and subtracting said third and fourth signals from said fifth signal to derive said second signal.

19. The method claimed in claim 17 comprising the steps of moving said manipulator and workpiece back and forth along a predetermined path between two predetermined positions relative to said press tools, and generating said second signal in proportion to the distance between the actual position of said workpiece and the one of said predetermined positions toward which said manipulator and workpiece are moving.

20. In control means for a forging press provided with press tools, said control means comprising means for turning the workpiece between passes through any preselected one of a plurality of angles relative to the press tools, the improvement which comprises selector means sensitive to a plurality of dimensions of the workpiece for automatically varying the selected angle in accordance with a predetermined program whenever all of said plurality of workpiece dimensions have reached standards individually predetermined therefor.

21. Control means as claimed in claim 20 comprising a coincidence gate through which said selector means is actuated only when each of said workpiece dimensions has reached the predetermined standard therefor.

22. Control means as claimed in claim 21 comprising a counter connected to indicate the number of successive passes at the end of which said workpiece dimension has conformed to said predetermined standard.

23. In control means for a forging press of the type comprising press tools, a workpiece manipulator, and control means for said press tools and workpiece manipulator settable to determine the starting and ending points of a pass of said workpiece relative to said press tools, the percentage reduction in thickness of said workpiece during each pass, the bite presented by said workpiece manipulator to said press tools, and the angular position of said workpiece relative to said press tools during each pass, means for sensing when said workpiece has been forged to predetermined dimensions during a plurality of passes constituting a particular phase, and means responsive to the output of said sensing means for automatically altering the setting of said control means when said workpiece has been forged to said predetermined dimensions at the conclusion of said phase, so that said workpiece will be forged to different dimensions in an ensuing phase.

References Cited by the Examiner

UNITED STATES PATENTS

| | | | |
|---|---|---|---|
| 2,046,355 | 7/36 | Wood | 39—553 |
| 2,345,572 | 4/44 | Brosius | 78—96 |
| 2,922,053 | 1/60 | Steel | 307—149 |
| 3,054,311 | 9/62 | Murtland | 80—56.1 |
| 3,122,831 | 3/64 | Bailey et al. | 29—556 |

WHITMORE A. WILTZ, *Primary Examiner.*

HYLAND BIZOT, *Examiner.*